(12) United States Patent
Rössl

(10) Patent No.: US 11,955,052 B2
(45) Date of Patent: Apr. 9, 2024

(54) ELECTRONIC SHELF LABEL WITH ACTION TRIGGERING

(71) Applicant: SES-Imagotag GmbH, Fernitz-Mellach (AT)

(72) Inventor: Andreas Rössl, Graz (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 0 days.

(21) Appl. No.: 17/786,648

(22) PCT Filed: Dec. 23, 2019

(86) PCT No.: PCT/EP2019/086994
§ 371 (c)(1),
(2) Date: Jun. 17, 2022

(87) PCT Pub. No.: WO2021/129934
PCT Pub. Date: Jul. 1, 2021

(65) Prior Publication Data
US 2023/0042843 A1  Feb. 9, 2023

(51) Int. Cl.
*G09G 3/20* (2006.01)
*G01C 9/00* (2006.01)
*G01J 1/42* (2006.01)
*G01J 1/44* (2006.01)
*G01S 13/08* (2006.01)
*G09G 3/34* (2006.01)

(52) U.S. Cl.
CPC ............ *G09G 3/2096* (2013.01); *G01C 9/00* (2013.01); *G01J 1/4204* (2013.01); *G01J 1/44* (2013.01); *G01S 13/08* (2013.01); *G09G 3/344* (2013.01); *G01J 2001/446* (2013.01); *G09G 2330/023* (2013.01); *G09G 2370/16* (2013.01); *G09G 2380/04* (2013.01)

(58) Field of Classification Search
CPC ....................................................... G06F 16/55
See application file for complete search history.

(56) References Cited

U.S. PATENT DOCUMENTS

| 2006/0279527 A1* | 12/2006 | Zehner | G09G 3/38 345/107 |
| 2008/0073431 A1* | 3/2008 | Davis | G06F 3/147 235/383 |
| 2010/0106588 A1* | 4/2010 | Jones | G06Q 30/0223 709/248 |

(Continued)

*Primary Examiner* — Nan-Ying Yang
(74) *Attorney, Agent, or Firm* — Dennemeyer & Associates, LLC

(57) ABSTRACT

An electronic shelf label, which comprises:
  a display unit, which is designed for displaying image content, and
  a communication module, which is designed for wireless communication for the purpose of receiving image data, which represent the image content, and for transferring the image data to the display unit,
characterized in that
  a detector unit is provided, which is designed for detecting an incorrect positioning, which differs from a desired positioning, of the electronic shelf label, and for outputting an action signal when the incorrect positioning is detected, and in that
the electronic shelf label is designed to change the image content when the action signal is present.

14 Claims, 5 Drawing Sheets

(56) References Cited

U.S. PATENT DOCUMENTS

| | | | |
|---|---|---|---|
| 2013/0226742 A1* | 8/2013 | Johnson | G06Q 30/02 705/27.1 |
| 2016/0328767 A1* | 11/2016 | Bonner | G06K 7/10861 |
| 2019/0180150 A1* | 6/2019 | Taylor | G06V 30/224 |

* cited by examiner

ELECTRONIC SHELF LABEL WITH ACTION TRIGGERING

CROSS-REFERENCE TO RELATED APPLICATIONS

This is a 35 U.S.C. 371 National Stage Patent Application of International Application No. PCT/EP2019/086994, filed Dec. 23, 2019 which is hereby incorporated by reference in its entirety.

TECHNICAL FIELD

The invention relates to an electronic shelf label with action triggering.

BACKGROUND

An electronic shelf label system with action triggering for displaying information with the aid of electronic shelf label displays, referred to below as an ESL system for short, wherein ESL stands for "electronic shelf label", is known, for example, from WO 2015/124197 A1. This ESL system allows an extremely energy-saving operation of the ESLs with the aid of a proprietary time slot communication method. The ESLs are attached to shelf edge strips in a business premises of a supermarket in a manner corresponding to products and display product information. The actions are triggered in the ESLs in this ESL system by command transmission from a server to one of the ESLs, which leads to an action in the ESL, in which e.g. image content of an "electronic paper display" (abbreviated EDP) is changed and is subsequently displayed over a relatively long period of time essentially without energy consumption.

During operation in a real environment in a supermarket, it has however been shown that ESLs are sometimes removed inadvertently or even deliberately from their intended position, e.g. fall to the floor due to external influences, or else are moved to a different position in the business premises and re-fastened there on a shelf edge strip or are placed on a shelf or even a product promotion table. Here, it has proven problematic that the ESLs continue to display their previously defined image content, which can sometimes lead to confusion or misunderstandings for customers and for personnel of the supermarket.

The object of the invention is to provide an improved shelf label and an improved shelf label system in which the aforementioned problems are overcome.

SUMMARY OF THE INVENTION

This object is achieved by an electronic shelf label, which comprises a display unit which is designed for displaying image content, and a communication module, which is designed for wireless communication for the purpose of receiving image data, which represent the image content, and for transferring the image data to the display unit, characterized in that a detector unit is provided, which is designed for detecting an incorrect positioning, which differs from a desired positioning, of the electronic shelf label, and for outputting an action signal when the incorrect positioning is detected, and in that the electronic shelf label is designed to change the image content when the action signal is present.

The object is furthermore achieved by an electronic shelf label system, which comprises at least one shelf label according to the invention.

Using the measures according to the invention is associated with the advantage that the shelf label can determine the presence of an incorrect positioning autonomously and change its image content in a manner targeted to that. As the shelf label detects its incorrect positioning autonomously, that is to say independently, no server intervention or access point intervention or communication with the said server or access point is required in particular, in order to detect the incorrect positioning and to effect the change to the image content. Particularly preferably, the detection of the incorrect positioning and the change of the image content may also be independent of other, currently present states, particularly of the electronics, of the shelf label, that is to say for example take place with a higher, particularly with the highest priority.

The shelf label, when configured as a shelf label display, can comprise an energy-saving display unit such as e.g. an LCD display. In particular, however, the technology that is used is based on electronic ink or electronic paper technology. A display unit of this type therefore comprises a reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Very generally, a screen of this type is a reflective, that is to say passive, non-self-illuminating screen, in which the—relatively static—information display is based on light generated by an external (artificial or natural) light source shining onto the screen and being reflected from there to the observer.

Desired positioning may for example be understood to mean fastening to a shelf edge strip, wherein the rear side of the shelf label usually bears flat against the shelf edge strip. Shelf labels fastened in such a manner may have a horizontal or a slightly upwards aligned orientation of a screen of their display unit. Usually, the housings of the shelf labels have a cubic shape, so that the orientation of the screen for the most part results automatically due to the orientation of the shelf edge strip. Less often, the screens are orientated slightly downwards, which only appears sensible if they are positioned above the head of a person or an observer. Shelf labels may however also be designed to be set up on tables or shelves, where their desired positioning essentially results from their for the most part slight upwards inclination of the screen, which is optimized for viewing their image content. Thus, each shelf label has its personal, individual desired positioning, wherein of course, a group of shelf labels can also have a substantially similar or even identical desired positioning, e.g. if these are fastened to identically constructed shelf edge strips.

An incorrect positioning is understood to mean a positioning that differs from the individual desired positioning, which can essentially be recognized by a detection of a physical parameter, which is typical for the desired positioning or else for the incorrect positioning, which is discussed in detail in the following.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

According to a first embodiment, the detector unit may comprise a photodiode, which is connected to detector electronics. With the aid of the photodiode, it is possible to determine in a simple manner, whether the shelf label has been removed e.g. from a shelf edge strip or a shelf. The photodiode is preferably installed into the housing of the shelf label in such a manner in this case, that its light-sensitive zone can receive an ambient light of the shelf label, if the shelf label has been removed from the shelf edge strip (that is to say from the desired positioning) or lifted from the shelf or table (that is to say from the desired positioning). For a shelf label that is provided for installation on a shelf edge strip, the light-emitting diode is consequently installed in such a manner that its light-sensitive zone can receive light which falls onto the rear wall of the shelf label housing. This is always the case if the shelf label is not installed on the shelf edge strip, where no light incident onto the rear wall can be present, because the rear wall bears flat against the shelf edge strip. For a shelf label that is provided to be set up on a shelf or table, the light-emitting diode is consequently installed in such a manner that its light-sensitive zone can receive light which falls onto the bottom wall of the shelf label housing. This is always the case if the shelf label was lifted from the shelf or table, so that light falls onto the bottom wall on which the shelf label would otherwise stand. The detector electronics are realized such in the present case that they detect differences in the conductivity of the photodiode and determine a detection as a function of a preset threshold value. Here, it may also be provided that the photodiode is not completely shadowed if there is a deviation from the desired positioning.

According to a second embodiment, the detector unit may comprise a proximity sensor, which is connected to the detector electronics. Similarly to as explained with reference to the photodiode, the proximity sensor can also be used or integrated into the shelf label housing. The physical principle, according to which the proximity sensor operates, essentially consists in an electromagnetic field or signal being sent and the detector electronics being designed in such a manner that they detect a change in the signal reflected by a different object, in order to detect an incorrect positioning that deviates from the desired positioning. In contrast to the use of a photodiode, the use of the proximity sensor is suitable in particular if e.g. from the outset there is a distance in the desired positioning between the respective shelf label and a reference object, to which the electromagnetic field or signal is sent.

According to a third embodiment, the detector unit may comprise a tilt sensor (or inclination sensor), which is connected to the detector electronics. Tilt sensors are also termed "inclinometers" or "clinometers" and essentially measure an angle of an object in relation to the direction of gravity. In the present use of the tilt sensor this angle does not have to be determined absolutely however. Rather, it is completely satisfactory if the detector electronics are designed to determine a change of this angle, which is typically the case if a shelf label is removed from a shelf edge strip (desired positioning) (e.g. falls down from the shelf edge strip) and then remains lying on the ground e.g. with the screen orientated downwards or upwards (incorrect positioning) or, on a shelf or table, is brought from the upright standing orientation (desired positioning) into a lying positioning (incorrect positioning).

According to a fourth embodiment, the detector unit may comprise a time-of-flight sensor, which is connected to the detector electronics. Such a time-of-flight sensor is based on the principle that the distance from a different object is measured based on the time difference between the emission of a signal and the receipt of the signal reflected by a different object. Time-of-flight sensors are typically very expensive, but their use opens further possibilities in the present context, however. Thus, with the aid of the time-of-flight sensor, it is possible to determine very easily whether there is a deviation from the desired positioning or not. If a time-of-flight sensor of this type is for example provided on the rear side of a shelf label designed for mounting on a shelf edge strip, in the case of the desired positioning of the shelf label on the shelf edge strip, it would essentially determine no distance between the shelf label and the shelf edge strip. However, as soon as the shelf label was removed from the shelf edge strip and came to lie with the screen facing down, it is possible with the aid of the time-of-flight sensor to determine the distance to the closest object, wherein this is usually the underside of a shelf running above the shelf label, if the shelf label is still lying on a shelf in the shelving unit, or is the ceiling of a business premises, if the shelf label comes to lie on the floor of the business premises or on the uppermost shelf of a shelving unit with a clear view up to the ceiling, or is the underside of a device or shelving unit, if the shelf label comes to lie under the device or shelving unit. Starting from the distance measurement, which does not at all have to be absolute, but in fact only needs to be relative, because the scenarios mentioned lead to sufficiently distinguishable sensor values, a conclusion about the expected location of the shelf label can be drawn based thereon, which can make finding the shelf label again easier.

In very general terms, it is established here that in a communication via the communication module, the status of the detector unit and the sensor values can of course also be requested.

The shelf label preferably comprises a long-term energy storage device for the electrical supply of the display unit during its image-content changing activity. This long-term energy storage device can, depending on the implementation, be a the battery, a rechargeable battery or else what is known as a "supercapacitor", supercap for short. Using the long-term energy storage device ensures that the display unit can execute image-content changing activity at any time. The advantage of the supercapacitor mentioned lies in the following facts, however. A supercapacitor, also termed an ultracapacitor, is a high-power capacitor with a capacitance that is much higher than in other capacitors, but the capacitor has lower voltage limits and bridges the gap between electrolyte capacitors and rechargeable batteries. It typically stores 10 to 100 times more energy per unit volume or mass than electrolyte capacitors, can receive and output charge much faster than batteries, and tolerates many more charging and discharging cycles than rechargeable batteries.

The long-term energy storage device can be provided in the shelf label, e.g. realized as a supercap, in addition to a battery which is provided for normal operation. Also, the shelf label may comprise an energy transmission receiver, which can receive energy in a contactless manner for charging the long-term energy storage device with the aid of directed wireless signals sent from an energy transmission transmitter. This energy transmission technology is known under the term "power over WiFi".

The communication module can for example be designed for communication with an access point according to the WLAN, ZigBee or else Bluetooth communication protocol, etc., wherein the access point forms an interface to a server, which executes a materials management or shelf label control software. This software can however also be provided as a cloud solution via an external computing centre. A multiplicity of such access points may be installed in a business premises, wherein each access point supplies a group of shelf labels, which are wirelessly assigned to it, that is to say are registered with the access point.

According to a first exemplary embodiment of the shelf label, the communication module is designed for wireless communication according to a time slot communication method, wherein in the time slot communication method, a number of time slots in a repeating sequence per time slot cycle are available for communication, each time slot is preferably identified by a unique time slot symbol, and the communication module comprises an energy-saving sleep state, in which it is not ready to communicate, and the communication module comprises an active state, in which it is ready to communicate, and wherein the communication module is designed to change from the sleep state to the active state promptly upon the occurrence of the time slot to which the shelf label is assigned, and wherein the long-term energy storage device is used for the electrical supply of the detector unit during the active and the sleep state. This design is associated with the advantage that a majority of the electronics of the shelf label can remain in the energy-saving sleep state for as long as possible and at the same time the detector unit can be active, in order to be able to detect the change of the positioning of the shelf label as rapidly as possible after the occurrence of the change of the positioning. Thus, in the present case, the electronics of the display unit can permanently be supplied with energy, specifically also if there is no detection of the incorrect positioning. On the other hand, the electronics of the display unit can only be supplied with energy if the detection of the incorrect positioning takes place. This can take place e.g. in a manner controlled by the detector unit. After the image-content-change activity has taken place, the electrical supply of the display unit can be stopped again.

A proprietary time slot communication method is—as mentioned—preferably used during the communication, which is known in principle from WO2015/124197, pages 2 to 4, and FIGS. 1-8C with the associated description, the specific disclosure of which is hereby incorporated by reference, wherein the most important aspects are discussed in the following.

According to this proprietary time slot communication method, the access point communicates with a number of shelf labels such that a number of time slots in a constantly (continuously) repeating sequence per time slot cycle are available for communication, and each time slot is identified uniquely by a unique time slot symbol and thus can be distinguished from other time slots solely by the time slot symbol. According to the method, the access point sends, for the currently present time slot, a synchronization data signal comprising the time slot symbol at the start of the respective time slot. The shelf labels know this time slot communication method system and are designed to change, at a wake-up time, from an (extremely energy-saving) sleep state, e.g. in which they are not ready to receive wireless signals, into an active state, in which they are e.g. ready to receive wireless signals, and to receive the synchronization data signal in the active state, and, when the received time slot symbol indicates a time slot defined for the respective shelf label, to define a new wake-up time, which corresponds to the next occurrence of the time slot defined for this shelf label, in a time slot cycle following the currently present time slot cycle.

This has the advantage that a synchronism between the access point and the shelf labels is detected, maintained and ensured during operation of the system in the most simple and yet extremely robust manner. This also improves the energy efficiency of all the shelf labels which are logically assigned to a single access point, because the check for synchronism takes place immediately at the start of the time slot. The further behaviour of the shelf label then depends on whether it is addressed.

In principle, the synchronization data signal could be formed exclusively by the time slot symbol, and further communication parameters required for communication with the access point (or server), such as e.g. address data for addressing or command data for transmitting commands, could be separate from the synchronization data signal. However, since the time slot symbol is preferably an extremely compact indicator for synchronizing communication in the system, that is to say, can be formed e.g. by the serial number of the time slot, it is clear that further information can be embedded in the synchronization data signal in addition to the time slot symbol.

It is therefore advantageous if the access point is designed to embed in the synchronization data signal address data, with the aid of which a number of shelf labels per time slot can be addressed individually.

Analogously to the previous statements relating to embedding address data, there is a further considerable contribution to system efficiency when the access point is designed to embed in the synchronization data signal command data, which cause the addressed shelf label to execute a command. However, a command can also, for example, be transmitted to all the shelf labels assigned to a certain time slot without individual addressing and can then be executed by a relatively large group of shelf labels, for example all of them.

In principle, the shelf label could also execute a standardized (predefined) task merely by detecting its individual addressing, without an explicit command having to be received. However, it has proven particularly advantageous when address data are transmitted to address an individual shelf label and command data are transmitted to transmit a command to the said individual shelf label, and the shelf label is designed to evaluate the command data and execute the command when it is addressed individually with the aid of the address data. A command for a single shelf label can thus be transmitted in a sometimes relatively large group of shelf labels.

The access point can however also be designed such that it only tunnels data which originate from the server or from the shelf label, that is to say only realizes the conversion between wired communication and wireless communication, wherein the time slot communication method is then provided or handled directly by the server.

As explained at the beginning, the EPD does not require energy consumption over a relatively long time period to display an image content. Therefore, in current shelf labels, the EPD is often only supplied with electrical energy within a time slot assigned to the shelf label if a change to the image content is necessary owing to communication via the communication module in the active state. In a move away from that, it is now provided that the long-term energy storage device is also used for the electrical supply of the display unit during its image-content changing activity during the sleep state—which usually lasts a relatively long time compared to the active state. This allows a visualization of the detected incorrect positioning which is rapid and above all detached from the cycle of the change between active state and sleep state.

According to a second exemplary embodiment of the shelf label, the communication module is designed for communication according to a near field communication—abbreviated to NFC—specification and designed to generate a supply voltage for the shelf label when receiving an NFC signal, wherein the long-term energy storage device is used for electrically supplying the detector unit during the absence of the NFC signal, that is to say in a time period without the said NFC signal.

In the present case, the ESL system comprises a near field communication—abbreviated to NFC—sub-system on a shelf edge strip of a shelving unit, wherein the NFC sub-system is characterized in that the shelf edge strip comprises an NFC reader which is designed for wireless communication with the access point. In a departure from the descriptions of the first exemplary embodiment, the NFC reader is now designed for wireless communication with the access point according to the described time slot communication method.

Furthermore, the NFC sub-system comprises a conductor loop connected to the NFC reader, which is constructed along the shelf edge strip and is used for NFC communication with one or more NFC-enabled shelf labels, wherein at least one NFC-enabled shelf label is attached to the shelf edge strip in a manner corresponding to the conductor loop. In this. NFC sub-system, the NFC reader is therefore used for NFC communication with the NFC-enabled shelf label, wherein the shelf labels addressed by the server are spoken to or addressed via the NFC reader. The NFC reader used here therefore also comprises, in addition to its standardized NFC communication module, a further access communication module, which is designed for communication according to the aforementioned time slot communication method. The NFC sub-system in the electronic shelf label system therefore assumes the role of an intermediary device in order to be able to address the shelf labels addressed by the server physically, that is to say, to be able to communicate with them. In the NFC sub-system, the communication therefore takes place in compliance with the NFC standard, the shelf labels being addressed by means of the server, and the NFC sub-system converting or applying this addressing. For the physical addressing of the shelf labels, it is possible to proceed in two ways, specifically as follows.

According to a first embodiment, the NFC reader stores a data structure representing an assignment of a shelf label fastened to its shelf edge strip to one of the time slots, the NFC reader being designed to check the time slot to which a shelf label is assigned according to the data structure as to whether the shelf label fastened to its shelf edge strip is addressed by the server. In the present case, the data structure is composed of the shelf label identifier, which is also known to the server and used by it for addressing, and the associated time slot symbol. In the present case, the server does not have to be informed of the existence of the NFC reader and only has to know the relationship between access point and shelf label.

According to a second embodiment, the NFC reader itself is assigned to one of the time slots and it stores a data structure which represents the shelf labels fastened to the shelf edge strip of the NFC reader, and the NFC reader is designed to check the time slot to which it is itself assigned as to whether the shelf label fastened to its shelf edge strip is addressed by the server. In the present case, the data structure is composed of the shelf label identifier of the shelf labels which are fastened to the shelf edge strip of the relevant NFC reader. In the present case, the server must also know about the existence of the NFC reader and the relationship between access point and NFC reader and also the relationship between NFC reader and the shelf labels thereof, in order to be able to address the respective shelf label indirectly via the NFC reader.

NFC stands for near field communication, and the applicable standards are e.g. ISO/IEC 13157, -16353, -22536, -28361, etc. During NFC communication, the NFC reader generates an NFC signal and sends it with the aid of the conductor loop (as antenna). This NFC signal is initially received on the side of the NFC-enabled shelf label with the aid of an NFC interface of the shelf label and used for generating an internal supply voltage, in order to electrically supply and start the electronics of the shelf label, in order then to communicate with the NFC reader in an NFC-compliant manner via the NFC interface of the shelf label.

During the NFC-compliant communication, NFC identifiers of the communication partners (NFC reader and NFC-enabled shelf label) involved are used, which typically differ from those of the shelf label identifier.

The NFC-enabled shelf label is furthermore designed such that it stores the electrical energy transmitted with the aid of the NFC signal by the NFC reader in a supercap for its operation during the absence of the NFC signal. This allows an autonomous provision of diverse functions, particularly the detection of the incorrect positioning and the image-content changing activity, which provision is independent of the time period when the NFC signal is present.

The implementation of the NFC interface on the side of the NFC reader and also the shelf label belongs to the routine activity of the person skilled in the art, who is familiar with the relevant "Application Notes" of the producers of NFC-ICs (IC stands for "integrated circuit" here).

The NFC reader can also comprise a battery- and/or rechargeable-battery-based energy supply. However, the NFC reader preferably comprises a supercap and an energy transmission receiver, which, as explained previously, allows a "power over WiFi" energy transmission, so that the NFC reader of each shelf edge strip is supplied with energy in a contactless manner. The NFC reader is furthermore designed to use the wireless signal, using which the energy is transmitted, to electrically charge the supercap.

In the present case, it is particularly advantageous if the long-term energy storage device is used during the absence of the NFC signal for the electrical supply of the display unit during its image-content changing activity. Here also, when the detection of the incorrect positioning has taken place, the display unit can in fact without delay and above all, independently of the NFC-signal-based supply, visually implement the incorrect positioning condition due to the direct availability of the energy supply.

Particularly preferably, the shelf label is designed for changing the image content such that the display unit is designed to directly receive the action signal, particularly as an interrupt signal, and as a consequence of the receipt of the action signal, to delete the last-displayed image content. This measure constitutes the most effective procedure for avoiding misunderstandings or confusion immediately when incorrect positioning is detected. A cleared screen, that is to say a screen which does not contain any content, cannot give a customer false impressions and is usually ignored. The personnel of the supermarket must merely be instructed to collect shelf labels which they find in unusual positions or with an unusual orientation and which do not show any image content.

Furthermore, the design for changing the image content may comprise the measure that the display unit is caused to display, instead of the last-displayed image content, a message as image content, which displays the internal state of the detection, particularly in combination with a call to action. This measure is based on the fact that art "X" filling the screen, together with the text "Hand in label" is saved in an internal memory of the display unit e.g. as image content. Here, the "X" represents the internal state of the detection of an incorrect positioning and the text "Hand in label" in this context forms the call to action, which is directed both at personnel and customers in a user-group-neutral manner.

Particularly preferably, the shelf label, particularly the detector unit thereof, is designed to digitally store the state of the detection of the incorrect positioning. This prevents multiple changes of the positioning leading to multiple image-content-changing activities, which would ultimately result in an unnecessary energy consumption.

In this context, it has furthermore proven advantageous that the shelf label is designed only to carry out an image-content-changing activity again following the change of the image content which took place due to the detection of the incorrect positioning, after the stored state of the detection of the incorrect positioning had been deleted with the aid of a communication via the communication module. This can be realized such that a status bit is stored in the memory of the display unit, which represents the incorrect positioning and the status bit first has to be changed (e.g. deleted) from the server. Therefore, it is ensured that a shelf label is excluded from its regular use until the server has been able to register the incorrect positioning and the shelf label has again been integrated into the ESL system in a regular manner. This may mean that the server was able to capture the detection of the incorrect positioning by means of communication via the communication module (that is to say was able to query the status bit), was able to delete the stored state (that is to say was able to change the value of the status bit) and was then able to process a new assignment of the shelf label to a product (or a reactivation of this previous assignment).

The electronics of the various devices of the system, just like the interface etc. thereof can be realized with the aid of a very wide range of passive and also active electronic components in a discrete and also integrated manner. Preferably, a microprocessor with corresponding peripheral components or a microcontroller, upon which a software for providing the various functionalities is executed, is also used in this case. Also, what are known as ASICs (Application-Specific Integrated Circuits) can be used. In detail, the various assemblies or functional groups, particularly the consumers in the shelf label, can in addition to passive components comprise the aforementioned individual integrated circuits (microcontroller, microprocessor, ASIC, function-specific ICs, etc.).

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
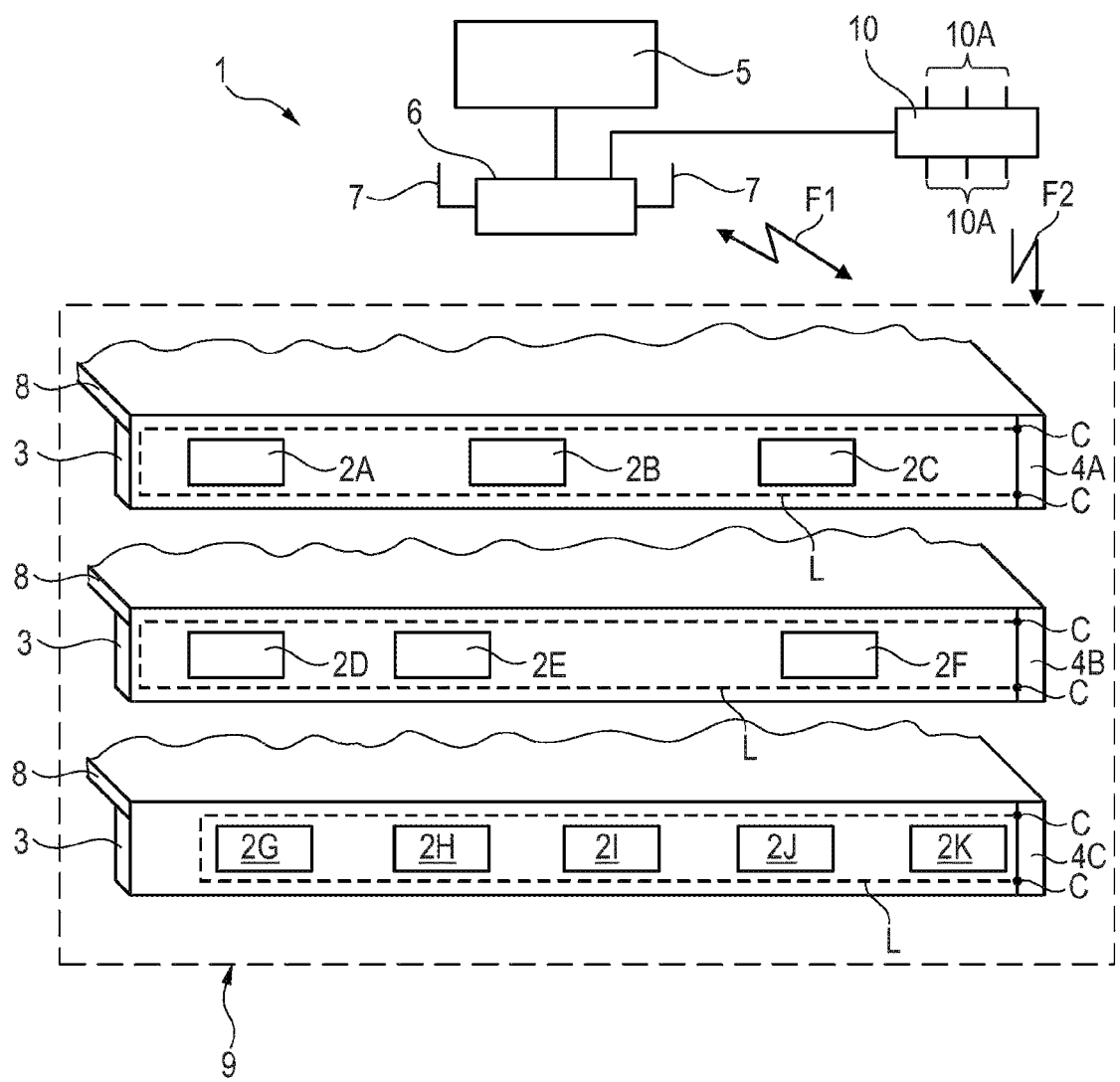
FIG. 1 schematically shows an electronic shelf label system according to the invention.

FIG. 1 illustrates a shelf label system 1, which comprises a number of identically constructed electronic NFC-enabled shelf labels 2A-2K realized as shelf label displays and fastened to three "intelligent" shelf edge strips 3. Each of the shelf edge strips 3 comprises an NFC sub-system. An NFC reader 4A-4C is a constituent of each NFC sub-system. The NFC reader 4A-4C is inserted laterally into the shelf edge strip 3. Each shelf edge strip 3 furthermore comprises, as a constituent of the NFC sub-system, a conductor loop L, which extends along the entire length of the shelf edge strip 3, and the conductor loop connectors C of which are electrically conductively connected to the NFC reader 4A-4C. The conductor loop L forms the antenna of the respective NFC reader 4A-4C and is thus a constituent, integrated in the shelf edge strip 3, of the respective NFC reader 4A-4C. As soon as shelf labels 2A-2K are installed on the respective shelf edge strip 3 corresponding to the conductor loop L thereof and have been detected by the NFC reader 4A-4C there, these shelf labels 2A-2K also form a constituent of the respective NFC sub-system of the shelf edge strip 3.

The respective NFC reader 4A-4C assumes the role of a shelf edge strip controller for controlling the shelf labels 2A-2K installed on its shelf edge strip 3. In this case, the respective NFC reader 4A-4C communicates contactlessly with the NFC-enabled shelf labels 2A-2K installed on its shelf edge strip 3 according to an NFC communication protocol. To this end, it sends an NFC signal with the aid of the conductor loop L, said NFC signal being used at the respective shelf label 2A-2K both for energy supply and for data transmission.

Also illustrated is a data processing device, which in the present case is realized with the aid of a server 5, which is connected in a wired manner to an access point 6, which comprises two antennas 7, for example.

The NFC readers 4A-4C are furthermore modified such that they are in wireless contact with the access point 6 via first wireless signals F1 according to a proprietary time slot communication method. Thus, for example, image contents of the shelf labels 2A-2K can be changed from the server 5, where necessary also associated status information can be requested from the shelf labels 2A-2K and transmitted to the server 5.

Each of the shelf edge strips 3 is mounted on the front edge of an individual shelf 8. The three shelves 8 illustrated all belong to a shelving unit 9 indicated only very schematically. Different products can be presented on the shelves 8 but in the present case are not illustrated for reasons of simplified illustration.

Furthermore, the NFC readers 4A-4C are designed such that they can for their part be supplied with energy with the aid of a second wireless signal F2. For this purpose, the system 1 comprises a supply transmitter 10 (also referred to as a wireless energy source), which is designed to transmit electrical energy at a certain transmitting power, such as 5 W for example, to a receiver (that is to say, to one of the NFC readers 4A-4C) with the aid of a focused or directed (second) wireless signal F2. Such a supply transmitter 10 also comprises a multiplicity of antennas 10A (in this case, six units are illustrated), with the aid of which the direction of the energy transmission (ultimately the propagation of the second wireless signal F2) can be set relatively precisely so that the second wireless signal F2 transmitting the energy arrives precisely at the respective NFC reader 4A-4C. This energy transmission is known under the term "power over WiFi".

It should also be mentioned at this point that, for reasons of simplicity, only one single access point 6 and one single shelving unit 9 have been visualized, but a multiplicity of such system components are present in a real environment of a supermarket. In that case, a single access point 6 would wirelessly supply a group of the shelving units 9 within its environment.

A block diagram of the shelf labels 2A-2K is explained below on the basis of FIG. 2. Since it is assumed in the present case that all shelf labels 2A-2K are constructed identically, reference is only made to a single shelf label 2A in the following.

The block diagram shows a communication module of the shelf label 2A, designed as a first NFC interface 11, with a coil 12A, which is connected to an interface circuit 11A. The coil 12A together with an interface capacitor 12B forms an antenna LC circuit 12C, with the aid of which an NFC signal of an NFC-enabled device can be received. In the present case, the NFC-enabled device is the NFC reader 4A-4C. The coil 12A is installed in the shelf label 2A as close as possible to the rear wall of the housing, substantially parallel to the rear wall of the housing. If the coil 12A is brought correspondingly close (a few tenths of a millimetre up to approx. 4 millimetres) to the conductor loop L, which is the case for the shelf label 2A attached to the shelf edge strip 3, the NFC signal sent with the aid of the conductor loop L can be received with the aid of the antenna LC circuit 12C and used in the shelf label 2A for energy supply and for bidirectional communication of data with the relevant NFC readers 4A-4C.

For this purpose, the shelf label 2A comprises what is known as a contactless power transmission unit 11B connected to the antenna LC circuit 12C, which comprises a rectifier unit 11C at the input side and a voltage regulator unit 11D at the output side. Thus, a first supply voltage VCC1 is generated relative to a first reference potential GND1 when the NFC signal is present and is then available for operating the NFC functionality and also further system components of the shelf label 2A.

The first NFC interface 11 furthermore comprises a communication unit 11E, with the aid of which the communication according to the NFC specification or protocol can be carried out. It comprises a load modulation unit 11F connected to the antenna LC circuit 12C for load modulation of the received NFC signal as a function of send data TX. A further constituent is a protection unit 11G, which is likewise connected to the antenna LC circuit 12C and protects against an undesirably high input power and is designed as a signal limiter. Furthermore, a dock generator unit 11H, which is connected to the antenna LC circuit 12C, is provided, which generates a system clock CLK on the basis of the received NFC signal. An ASK demodulation unit 11I (ASK stands for "amplitude shift keying" here) forms a further component, which generates receive data RX from small fluctuations of the amplitude of the NFC signal rectified with the aid of the rectifier unit 11C. The digital data processing takes place using a microcontroller unit 11J, which is clocked using the system clock CLK and using which incoming receive data RX are processed and outgoing send data TX are generated. The data processing takes place in this case according to program code, which is stored in the microcontroller unit 11J and is executed using the central processing unit (CPU) thereof.

The block diagram also shows a display unit 13A, which is connected to the first NFC interface 11 and is divided into an electronic paper display controller 14 and an electronic paper display (EPD screen) 15 which can be controlled therewith. With the aid of the controller 14, the data D received are interpreted, the image contents of the screen 15 are changed accordingly, where necessary, or else status information in the form of data D is output to the respective NFC reader 4A-4C via the first NFC interface 11.

In the present case, the shelf label 2A comprises further consumers in addition to the display unit 13A, namely an input unit 13E for receiving a user input, a camera unit 13D for capturing images of objects in front of the shelf label 2A, a temperature sensor unit 13C for detecting the ambient temperature of the shelf label 2A and a detector unit 13B for detecting an incorrect positioning of the electronic shelf label 2A deviating from a desired positioning, wherein an action signal IR is output to the display unit 13A when the incorrect positioning is detected.

As a detector element, the detector unit 13B comprises a photodiode, the conductivity of which depends on the intensity of the light which shines onto it. It is installed or integrated into the housing of the shelf label 2A in such a manner that it can receive light which shines onto the rear side of the housing. Thus, the housing can comprise a viewing window in the centre of the rear wall for example (see FIG. 7) and the photodiode is attached to a printed circuit board corresponding to the viewing window in the interior of the housing of the shelf label. The photodiode can also be inserted into a recess on the rear wall of the housing and finish level with this on the outside.

The detector unit 13B furthermore comprises detector electronics which are realized on the said printed circuit board. The detector electronics comprise e.g. an operational amplifier circuit (abbreviated to OP circuit, e.g. a photodiode amplifier with downstream-connected comparator and, if appropriate, downstream-connected signal-shaping circuit), with the aid of which, exceeding of a threshold value of the current by the photodiode can be detected. The realization may however take place with the aid of a light sensor integrated in an IC (integrated circuit).

The exceeding of the threshold value in the present case is an indicator that the shelf label 2A has been triggered by the shelf edge strip 3 and the photodiode, which is now accessible on the rear side of the housing is being irradiated with light. The OP circuit then emits the outputs the action signal IR to the display unit 13A, actually to an interrupt input of the display unit 13A, which then deletes the content of its screen 15. This can take place such that the currently displayed image content is replaced by a different image content, that is to say, technically speaking, there is a switch from a memory region of a memory of the display unit 13A, which stores the currently displayed, first image content in the form of data, to a different memory region, in which the second image content, which is then to be displayed, is stored in the form of data. The first image content was received by communication with the server. The second image content, which is used during the deletion of the screen 15, may be preset, that is to say e.g. programmed ex-works or else determined situation-specifically by a previous server communication. The process of deleting the image content is controlled by the electronic paper display controller 14, the electronic paper display controller receives the action signal IR at its interrupt input, which triggers an interrupt in it, which leads to the start of a software stored for this situation, and the electronic paper display controller then executes this software in order to implement the described measures.

Analogously to the display unit 13A, each of the units 13B-13E can comprise its own integrated controller circuit (IC). These additional consumers 13B-13E are defined to be operated temporally separately from the existence of the NFC signal, with the aid of which, as explained, the first supply voltage VCC1 is generated.

For this purpose, the shelf label 2A comprises a long-term energy storage unit 13F, which is divided into a long-term energy storage device in the form of a supercapacitor 13H and a charging stage 13G, which is designed for charging the supercapacitor 13H, wherein, when the NFC signal is present, electrical energy for operating the additional consumers 13B-13E outside of a time period when the NFC signal is present is stored, with the aid of the charging stage 13G, in the supercapacitor 13H. The charging stage 13G is connected at the input side to the first supply voltage VCC1 with respect to the first reference potential GND1, that is to say connected to the output of the contactless power transmission unit 11B. According to a different design, the supercapacitor 13H can be connected directly to the output of the power transmission unit 11B. In the present design, at the output side, the charging stage 13G provides a second supply voltage VCC2 with respect to a second reference potential GND2, wherein the first and the second reference potentials GND1 and GND2 are identical, that is to say corresponding switching points are connected to one another.

The two supply voltages VCC1 and VCC2 may differ or be the same with regards to their value, which ultimately depends on the specifications of the consumers 13A-13E to be supplied and/or on the state of charge of the supercapacitor 13H. In this context, it may be mentioned that the display unit 13A can be supplied either only with the first supply voltage VCC1 or only with the second supply voltage VCC2 or optionally, that is to say as a function of whether the first supply voltage VCC1 is present or not, either with the first supply voltage VCC1 or with the second voltage VCC2.

Figure 2:
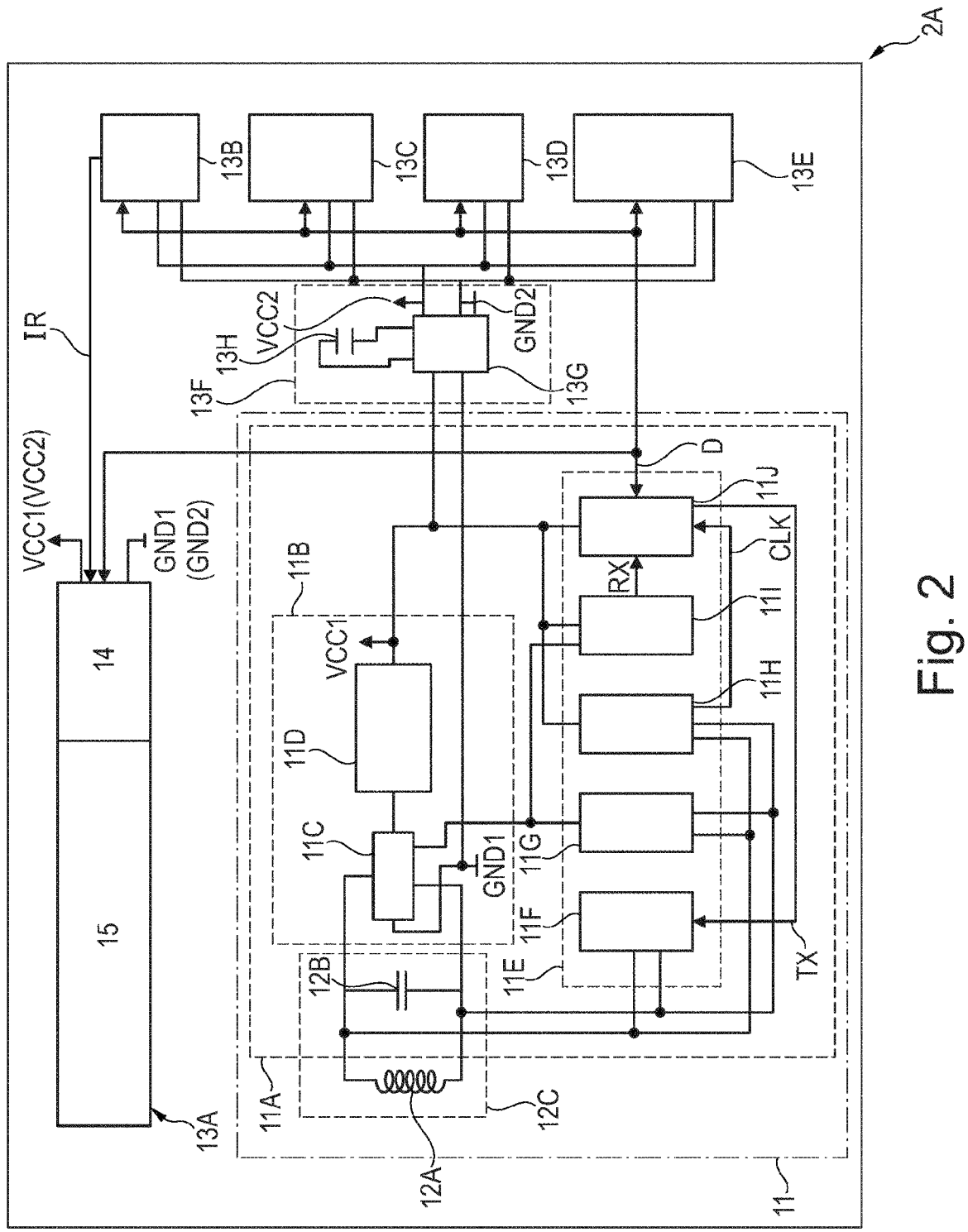
FIG. 2 schematically shows a block diagram of a shelf label display.

Also, if it is assumed in the present explanation that the shelf labels 2A-2K all have the same design, that is to say all comprise the consumers 13A-13E shown in FIG. 2, it is made clear at this point that this does not have to be the case. Thus, for example, only a few shelf labels e.g. 2A, 2C, 2D, 2F, 2G and 2I per shelf edge strip 3 may be realized exclusively as a shelf label display. Other shelf labels, e.g. 2B, 2E, 2H and 2J could have no display unit 13A at all, but in return could comprise a camera unit and each comprise a time-of-flight sensor unit and ultimately, the last remaining shelf label 2K could only comprise a temperature sensor unit. In principle however, any combination of the consumers 13A-13E may be provided for each shelf label 2A-2K here. Preferably, however, all comprise at least the detector unit 13B. The individual availability of the respective consumer 13A-13E may be realized by a selective hardware design of the respective consumers 13A-13E in the respective shelf label 2A-2K. This may also be realized such that a few or all types of consumers 13A-13E are implemented and can be enabled with the aid of control commands, that is to say can be activated using software and/or are available or even not available due to specific designs of the housing of the respective shelf labels 2A-2K.

A block diagram of the shelf edge strip 3 is explained below on the basis of FIG. 3. The reference number 4 was used here for the identically constructed NFC readers 4A-4C.

Figure 3:
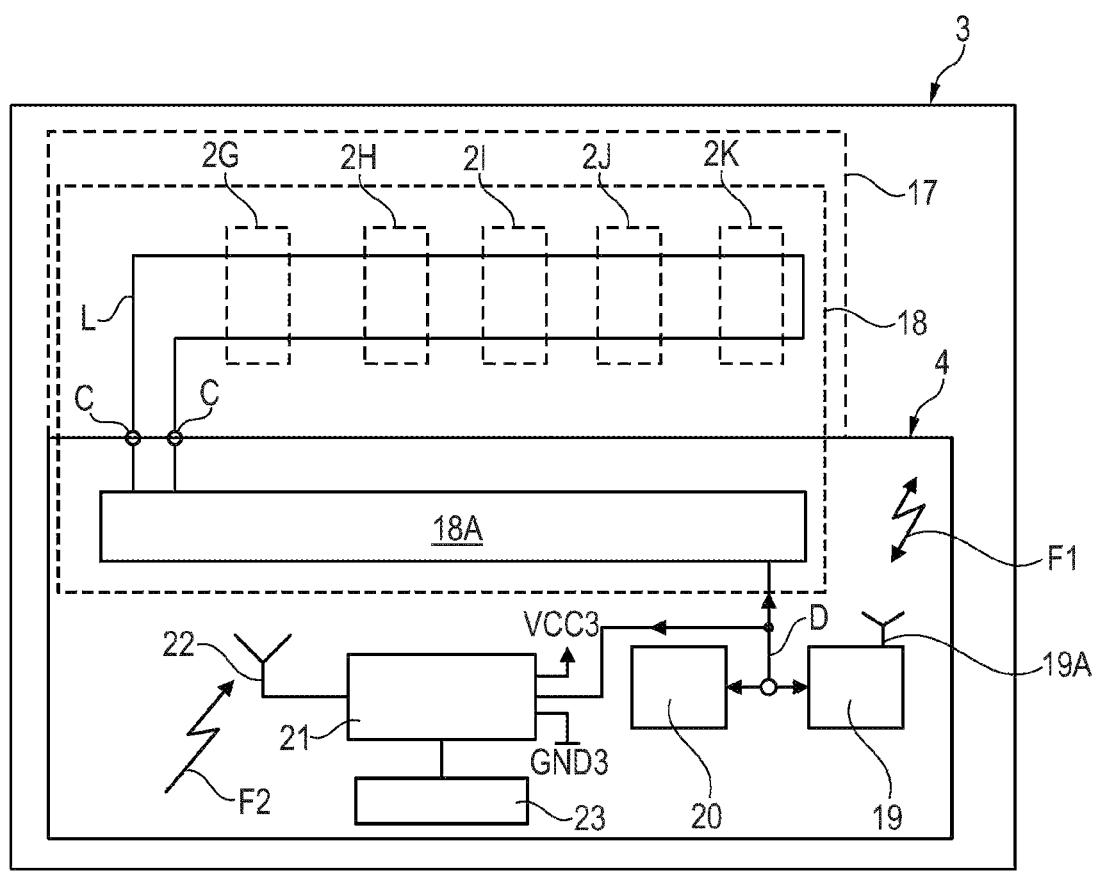
FIG. 3 schematically shows a block diagram of an "intelligent" shelf edge strip.

In FIG. 3, it is indicated that the shelf edge strip 3 supports the shelf labels 2G-2K and is therefore the shelf edge strip 3 illustrated at the bottom in FIG. 1. The shelf labels 2G-2K are positioned corresponding to the position of the conductor loop L. In contrast to FIG. 1, the electrical connection of the loop connectors C to electronics 18A of the NFC reader 4 can be seen. The conductor loop L forms, together with the second electronics 18A, a second NFC interface 18 of the NFC reader 4. In this case too, the electronics 18A comprise their own NFC reader controller (not illustrated), which provides the entire NFC reader functionality. With the aid of the second NFC interface 18, the NFC signal can be generated and output, and thus electrical energy can be transmitted contactlessly to the shelf labels 2G-2K, and bidirectional communication of data D with them can be carried out.

It should be emphasized at this point that although the conductor loop L is a constituent of the NFC reader 4, it is accommodated outside the NFC reader 4 in the mechanical structure of the shelf edge strip 3. This is symbolized by a structure 17 of the shelf edge strip 3, which encloses the conductor loop L and adjoins the NFC reader 4.

The NFC reader 4 furthermore comprises an access point communication module 19, which is designed for wireless communication with the access point 6 illustrated in FIG. 1, e.g. in the 2.4 GHz frequency band. To this end, the access point communication module 19 comprises electronics (not illustrated in detail) designed therefor and an antenna configuration 19A, which can also comprise multiple antennas and forms the analogue interface for this wireless communication. To control the internal processes and communication with the access point 6 according to the aforementioned proprietary time slot communication method, the supply device 4 comprises a control unit 20. The control unit 20 is realized with the aid of a microcontroller, which is connected to the second NFC interface 18 and the access point communication module 19 via a bidirectional databus.

To realize the "power over WiFi" energy transmission, the NFC reader 4 comprises a supply receiver 21 which is suitable for receiving the second wireless signal F2 and is equipped with its antenna configuration 22 (which can comprise multiple antennas) and electronics (not illustrated in detail), which are designed to receive the second wireless signal F2 and to store the energy transmitted therewith in an internal electrical energy storage device 23 (chargeable battery, rechargeable battery or supercap, etc.) and thus to generate a third supply voltage VCC3 in relation to a third reference potential GND3 for the electrical supply of the NFC reader 4.

The control unit 20 is also connected by its databus to the supply receiver 21.

During operation, the NFC reader 4 can query or monitor the state of charge of the energy storage device 23, for example with the aid of the control unit 20 of the NFC reader. As soon as the state of charge falls below a certain level, the control unit 20 can request a (re)charge, e.g. with the aid of the first wireless signal F1. This request is received by the access point 6 and can be forwarded directly to the supply transmitter 10 or forwarded to the supply transmitter 10 by involving the server 5, depending on the implementation. Since the exact geographical position (the three-dimensional coordinates) of each of the NFC readers 4 within the business premises and their unique reader identifier is known in the system 1 (e.g. the server 5), the supply transmitter 10 can send the second wireless signal F2 in a precisely directed manner towards the position of the respective NFC reader 4 requesting charging. The second wireless signal F2 is received there, and the energy thus transmitted is used to charge the internal energy storage device 23.

The shelf edge strip 3 described here is therefore designed, with the aid of its NFC sub-system, for contactless communication with the shelf labels 2A-2K installed on it and with an access point 6 wirelessly assigned to it and for contactless provision of energy within the meaning of energy storage for the NFC reader's 4 own operation and for the contactless energy supply of the respective shelf labels 2A-2K.

It should also be mentioned at this point that the supply transmitter 10 can also be installed in the access point 6.

Figure 4:
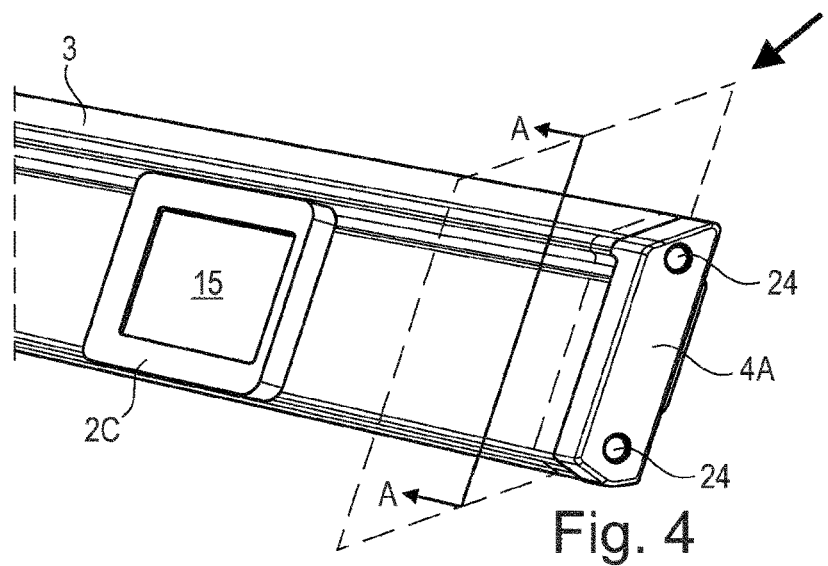
FIG. 4 schematically shows a perspective view of the shelf edge strip with an NFC-enabled shelf label and an NFC reader.

The structure of the "intelligent" shelf edge strip 3 is discussed below on the basis of FIGS. 4-6. FIG. 4 thus shows a shelf edge strip 3 (the uppermost shelf edge strip 3 in FIG. 1) with the shelf label 2C fastened to it and with the NFC reader 4A inserted laterally into the shelf edge strip 3 and fastened in the structure of the shelf edge strip 3 with screws 24. This shelf edge strip 3 has a length of approximately 3 m, a height of approximately 4.5 cm and a thickness of 1.2 cm, for example.

Figure 5:
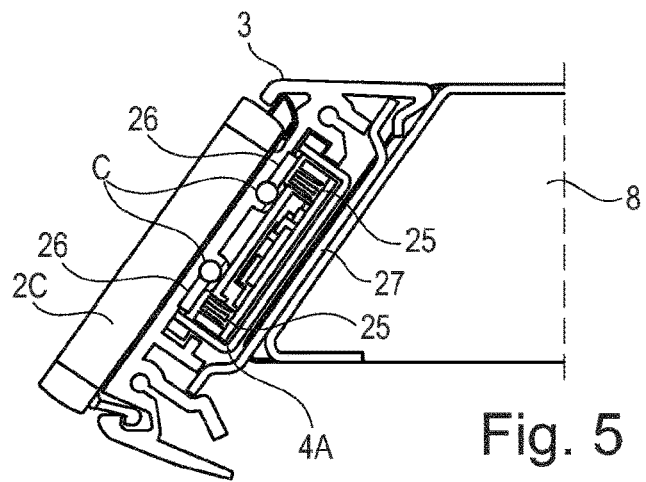
FIG. 5 schematically shows a cross section of the view according to FIG. 4 along the section plane A-A.

FIG. 5 shows a section through the shelf edge strip 3 according to a sectional plane A-A drawn in FIG. 4, which is oriented transversely (normal to the front side of the shelf edge strip 3) through the shelf edge strip 3 and runs at the point at which contact elements 25 of the NFC reader 4A are formed, which are used to contact the conductor loop L of the NFC reader 4A running in the shelf edge strip 3. In this view, the contact elements 25 make contact with contact tabs 26, which are for their part in contact with the conductor loop connectors C again. The contact tabs 26 can however be omitted if a different geometry is selected, so that the conductor loop connectors C can also be contacted directly with the contact elements 25. A shielding plate 27 constructed on the rear side of the shelf edge strip 3 can furthermore be seen and likewise extends along the entire shelf edge strip 3 analogously to the conductor loop L and allows a tuning of the antenna LC circuits of the NFC sub-system, which is detached from environmental influences. It can also clearly be seen how the rear side of the housing of the shelf label 2C bears flush against the shelf edge strip 3, so that practically no ambient light can shine onto the rear sides of the housing of the shelf label 2C.

Figure 6:
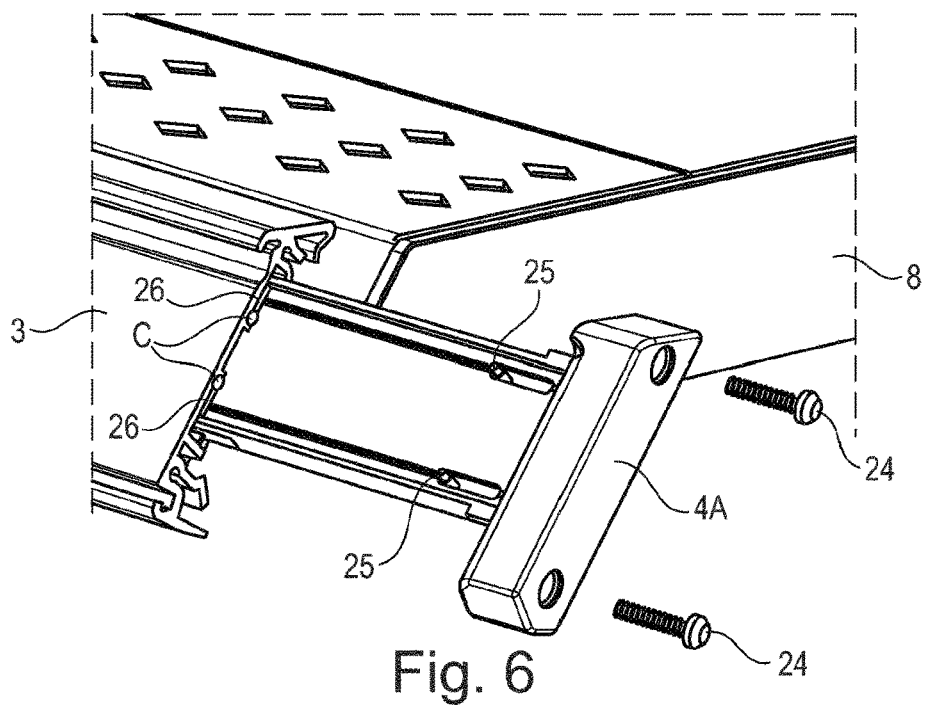
FIG. 6 schematically shows an exploded illustration of the shelf edge strip.

FIG. 6 shows the NFC reader 4A fastened to a rail or sliding mechanism, the sliding mechanism being partially drawn out of a shaft, designed for receiving it, in the shelf edge strip 3.

Figure 7:
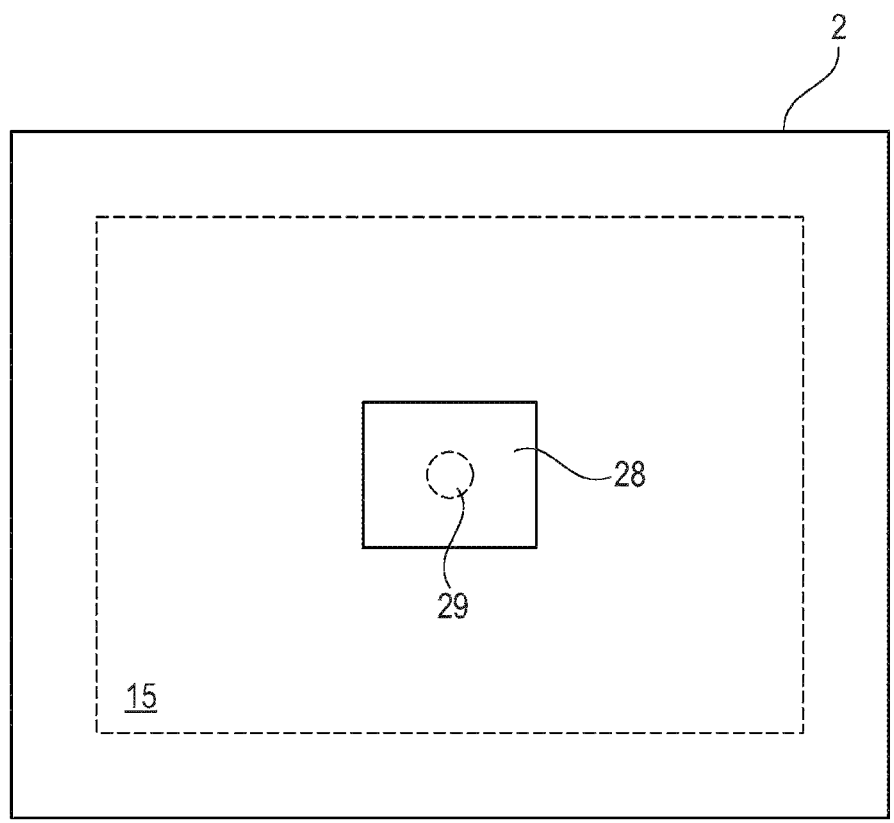
FIG. 7 schematically shows a view of the rear side of the housing of the shelf label with viewing window and photodiode arranged in a manner corresponding thereto.

FIG. 7 shows the rear side of a shelf label 2A-2K, here labelled with reference number 2, with a viewing window 28, through which the light from the rear side of the shelf label 2 can penetrate through the viewing window 28 and shine onto a photodiode 29 fastened on the printed circuit board of the shelf label 2, as soon as the rear side is no longer covered.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. An electronic shelf label (2A-2K), which comprises:
a display unit (13A) comprising a display (15), and which is designed for displaying image content, and
a communication module (11), which is designed for wireless communication for the purpose of receiving image data, which represent the image content, and for transferring the image data to the display unit (13A), characterized in that
a detector unit (13B) is provided, which is designed for detecting an incorrect positioning, which differs from a desired positioning, of the electronic shelf label (2A-2K), and for outputting an action signal (IR) when the incorrect positioning is detected, and which is designed to digitally store the state of the detection of the incorrect positioning,
and in that
the electronic shelf label (2A-2K) is designed to change the image content when the action signal (IR) is present, and to only carry out an image-content-changing activity again following the change of the image content which took place due to the detection of the incorrect positioning, after the stored state of the detection of the incorrect positioning had been deleted with the aid of a communication via the communication module (11).

2. The shelf label (2A-2K) according to claim 1, wherein the detector unit (13B) comprises a photodiode.

3. The shelf label (2A-2K) according to claim 1, wherein the detector unit (13B) comprises a proximity sensor.

4. The shelf label (2A-2K) according to claim 1, wherein the detector unit (13B) comprises a tilt or inclination sensor.

5. The shelf label (2A-2K) according to claim 1, wherein the detector unit (13B) comprises a time-of-flight sensor.

6. The shelf label (2A-2K) according to claim 1, which comprises a long-term energy storage device (13H) for electrically supplying the detector unit (13B) during its detection activity.

7. The shelf label (2A-2K) according to claim 1, which comprises a long-term energy storage device (13H) for electrically supplying the display unit (13A) during its image-content changing activity.

8. The shelf label (2A-2K) according to claim 6, wherein the communication module (11):

is designed for wireless communication according to a time slot communication method, wherein in the time slot communication method, a number of time slots in a repeating sequence per time slot cycle are available for communication, each time slot is preferably identified by a unique time slot symbol, and comprises an energy-saving sleep state, in which it is not ready to communicate, and comprises an active state, in which it is ready to communicate, and wherein the communication module (11) is designed to change from the sleep state to the active state promptly upon the occurrence of the time slot to which the shelf label (2A-2K) is assigned, and wherein the long-term energy storage device (13H) is used for the electrical supply of the detector unit (13B) during the active and the sleep state.

9. The shelf label (2A-2K) according to claim 8, wherein the long-term energy storage device (13H) is used during the sleep state for the electrical supply of the display unit (13A) during its image-content changing activity.

10. The shelf label (2A-2K) according to claim 6, wherein the communication module (11):

is designed for communication according to a near field communication—abbreviated to NFC—specification and designed to generate a supply voltage (VCC1) for the shelf label (2A-2K) when receiving an NFC signal, wherein the long-term energy storage device (13H) is used for electrically supplying the detector unit (13B) during the absence of the NFC signal.

11. The shelf label (2A-2K) according to claim 10, wherein the long-term energy storage device (13H) is used during the absence of the NFC signal for the electrical supply of the display unit (13A) during its image-content changing activity.

12. The shelf label (2A-2K) according claim 1, wherein the design for changing the image content comprises the measure that the display unit (13A) is designed to directly receive the action signal (IR), particularly as an interrupt signal, and as a consequence of the receipt of the action signal (IR), to delete the last-displayed image content.

13. The shelf label (2A-2K) according to claim 1, wherein the design for changing the image content comprises the measure that the display unit (13A) is caused to display, instead of the last-displayed image content, a message as image content, which displays the internal state of the detection, particularly in combination with a call to action.

14. A shelf label system (1), which comprises at least one electronic shelf label (2A-2K) according to claim 1.

* * * * *